US008292765B2

(12) United States Patent
Rolando et al.

(10) Patent No.: US 8,292,765 B2
(45) Date of Patent: *Oct. 23, 2012

(54) PULLEY TENSIONER FOR AN OIL WET BELT DRIVE

(75) Inventors: Adriano Rolando, Valperga (IT); Gianluca Pane, Ivrea (IT)

(73) Assignee: DAYCO Europe S.r.L., Chieti (IT)

( * ) Notice: Subject to any disclaimer, the term of this patent is extended or adjusted under 35 U.S.C. 154(b) by 149 days.

This patent is subject to a terminal disclaimer.

(21) Appl. No.: 12/451,883

(22) PCT Filed: May 6, 2007

(86) PCT No.: PCT/IT2007/000394
§ 371 (c)(1),
(2), (4) Date: Mar. 26, 2010

(87) PCT Pub. No.: WO2008/149389
PCT Pub. Date: Dec. 11, 2008

(65) Prior Publication Data
US 2011/0218066 A1    Sep. 8, 2011

(51) Int. Cl.
*F16H 7/08* (2006.01)
*F16H 7/10* (2006.01)
*F16H 7/14* (2006.01)
*F01M 1/00* (2006.01)

(52) U.S. Cl. ........ 474/112; 474/113; 474/114; 474/115; 474/101; 474/117; 184/6.17

(58) Field of Classification Search ............. 474/112, 474/113, 114, 115, 101, 109, 117, 118, 140, 474/135; 184/5.1, 6.17
See application file for complete search history.

(56) References Cited

U.S. PATENT DOCUMENTS

| 3,934,947 | A |   | 1/1976  | Walter et al.              |
|-----------|---|---|---------|----------------------------|
| 4,689,037 | A |   | 8/1987  | Bytzek                     |
| 4,721,495 | A | * | 1/1988  | Kan et al. ......... 474/135 |
| 4,832,665 | A | * | 5/1989  | Kadota et al. ...... 474/112 |
| 4,838,839 | A | * | 6/1989  | Watanabe et al. .... 474/135 |
| 5,011,460 | A | * | 4/1991  | Ouchi et al. ....... 474/133 |
| 5,052,982 | A | * | 10/1991 | Ouchi .............. 474/135 |
| 5,186,690 | A | * | 2/1993  | Yamamoto .......... 474/135 |
| 5,195,932 | A | * | 3/1993  | Hirai et al. ....... 474/135 |

(Continued)

FOREIGN PATENT DOCUMENTS

DE    4313058    10/1993

(Continued)

OTHER PUBLICATIONS

International Search Report mailed Nov. 9, 2007 in PCT Appln. No. PCT/IT2007/000394.

(Continued)

*Primary Examiner* — Sang Kim
*Assistant Examiner* — Minh Truong
(74) *Attorney, Agent, or Firm* — Davidson Berquist Jackson & Gowdey, LLP

(57) ABSTRACT

A tensioner (1) for a belt drive comprises a base(2, 3) defining an axis (A), a mobile element (4) hinged onto axis (A) and defining a guiding surface (22), an elastic helical element (18) having a square or rectangular cross section for actuating the mobile element (4) and an idle pulley (5) surrounding the guiding surface (22). The tensioner (1) further comprises a journal bearing (4, 29, 32, 33) for supporting the pulley (5) on the guiding surface (22).

19 Claims, 1 Drawing Sheet

U.S. PATENT DOCUMENTS

| | | | |
|---|---|---|---|
| 5,558,587 A * | 9/1996 | Church | 474/112 |
| 5,620,385 A * | 4/1997 | Cascionale et al. | 474/112 |
| 5,759,125 A | 6/1998 | Berg | |
| 5,993,340 A | 11/1999 | Rocca et al. | |
| 6,149,542 A * | 11/2000 | Lehtovaara | 474/112 |
| 6,165,091 A * | 12/2000 | Dinca et al. | 474/112 |
| 6,375,588 B1 * | 4/2002 | Frankowski et al. | 474/112 |
| 6,416,435 B1 * | 7/2002 | Szatkowski et al. | 474/112 |
| 6,761,483 B1 | 7/2004 | Michiels | |
| 6,857,979 B2 * | 2/2005 | Macnaughton et al. | 474/135 |
| 7,165,521 B2 | 1/2007 | Nakajima | |
| 7,273,432 B2 | 9/2007 | Schonmeier et al. | |
| 7,611,431 B2 | 11/2009 | Dinca et al. | |
| 7,637,829 B2 * | 12/2009 | Stone et al. | 474/112 |
| 7,874,950 B2 * | 1/2011 | Lehtovaara et al. | 474/135 |
| 7,980,976 B2 | 7/2011 | Stepniak et al. | |
| 7,985,151 B2 | 7/2011 | Singer | |
| 2003/0083164 A1 | 5/2003 | MacNaughton et al. | |
| 2006/0068957 A1 | 3/2006 | Stone et al. | |
| 2008/0025658 A1 | 1/2008 | Hochmayr et al. | |
| 2008/0153642 A1 * | 6/2008 | Baumuller et al. | 474/101 |
| 2008/0287233 A1 * | 11/2008 | Cantatore | 474/112 |
| 2010/0190594 A1 | 7/2010 | Rolando et al. | |
| 2010/0190595 A1 | 7/2010 | Baumuller et al. | |
| 2011/0045929 A1 | 2/2011 | Rolando et al. | |

FOREIGN PATENT DOCUMENTS

| | | |
|---|---|---|
| DE | 19614546 | 10/1996 |
| DE | 10021587 | 11/2001 |
| EP | 0709595 | 5/1996 |
| EP | 1746306 | 1/2007 |
| GB | 2233063 | 1/1991 |
| JP | 2004-150552 | 5/2004 |
| WO | WO 99/28652 | 6/1999 |
| WO | WO 2005/038297 | 4/2005 |
| WO | WO 2005/080820 | 9/2005 |
| WO | WO 2006/111988 | 10/2006 |
| WO | WO 2008/068782 | 6/2008 |
| WO | WO 2008/117319 | 10/2008 |
| WO | WO 2008/149390 | 12/2008 |

OTHER PUBLICATIONS

International Search Report and Written Opinion mailed Nov. 7, 2007 in PCT Appln. No. PCT/IT2007/000228.

International Search Report and Written Opinion mailed Oct. 23, 2007 in application PCT/IT2006/000836.

U.S. Appl. No. 12/312,978—Oct. 17, 2011 PTO Office Action.

* cited by examiner

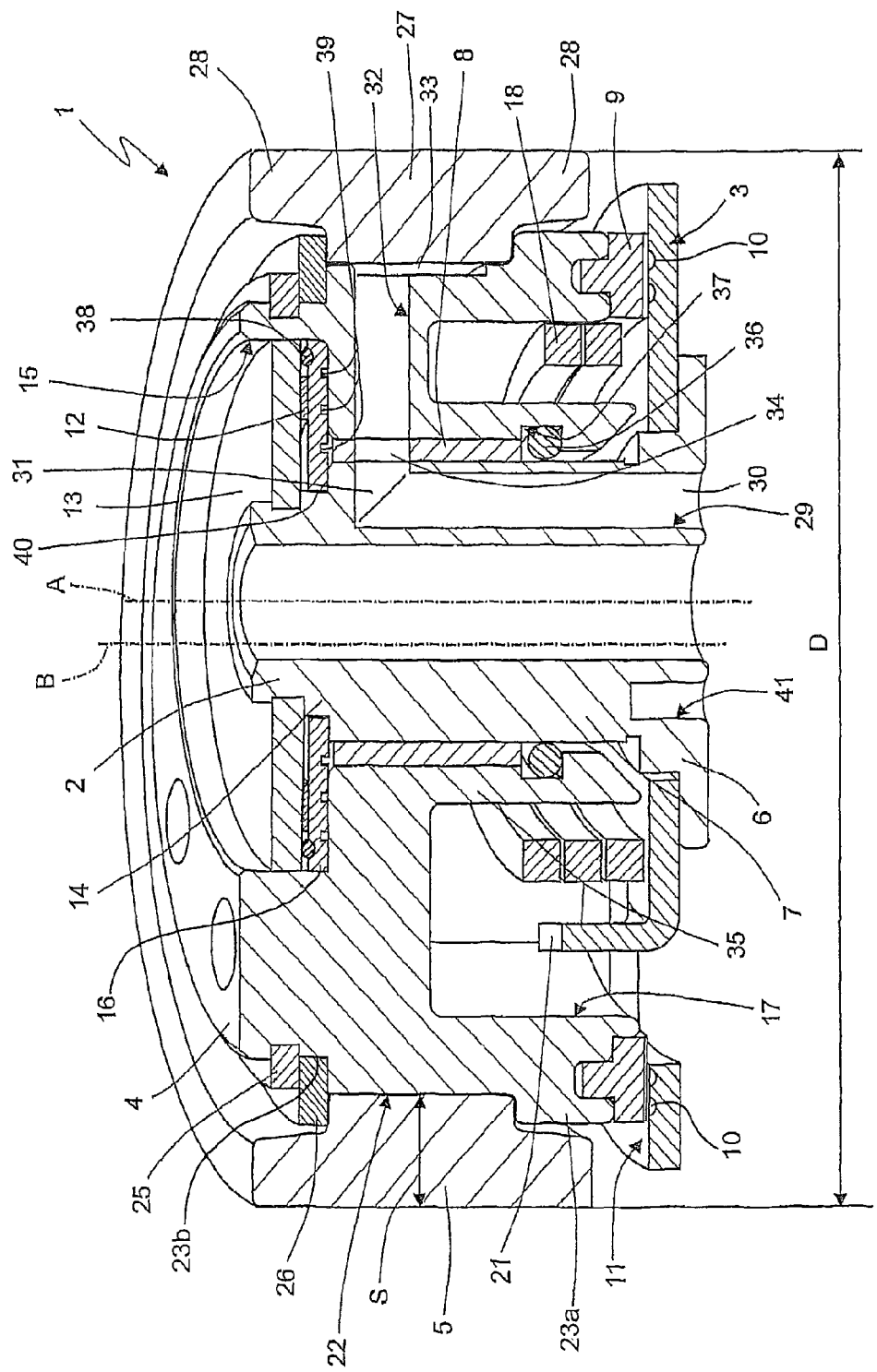

PULLEY TENSIONER FOR AN OIL WET BELT DRIVE

TECHNICAL FIELD

The present invention relates to a pulley tensioner for an oil wet belt drive, for example for a timing drive of an internal combustion engine.

BACKGROUND ART

Timing drives generally comprise either an oil-lubricated chain mounted in a compartment connected to the engine oil circuit or a dry-running toothed belt. A timing drive has recently been manufactured wherein either the belt is at least partially dipped in oil at rest, or the oil is adducted on the belt, e.g. by spraying by means of a specific nozzle or by whipping due to the action of the belt and of the pulleys.

An oil wet belt drive is lighter and causes less vibrations than a chain drive. Furthermore, the belt of an oil wet belt drive requires a lower operating tension than that of a chain and experimental tests have demonstrated that such drive allows to considerably reduce fuel consumptions and carbon dioxide emissions with respect to a traditional chain drive.

Such advantages may now be obtained also by upgrading or retrofitting engines originally designed for a chain drive. However, a chain drive presents different dimensions than a belt drive. Therefore, in order to upgrade a chain drive to a belt drive, all the components of the latter must be fitted within compartments originally designed for the chain drive. Possibly, some non-substantial parts of the engine may be modified in a marginal manner.

Specifically, an oil wet belt drive may be tensioned by means of an automatic pulley tensioner and this allows to further reduce the loss by friction with respect to chain drives, in which a sliding shoe is used.

However, a compartment designed for accommodating a chain drive presents an internal space which imposes major restrictions to the dimensions of an automatic pulley tensioner both along the axial direction and along the radial direction.

International patent application WO-A1-2006111988 filed by the same applicant describes a tensioner for an oil wet drive comprising a fixed pivot, a disc' mounted in an offset manner on the pivot and actuated by a tensioning spring and a pulley mounted in concentric manner on the disc by means of a ball bearing. Furthermore, the tensioner comprises a friction damping device to allow to appropriately dampen the oscillations of the belt also in the presence of oil.

Such tensioner is compact in axial direction and is particularly suitable for oil wet belt drives mounted aboard engines designed for operating with such drive.

However, in the case of upgrade of a chain drive, it is also important to reduce the radial dimension as much as possible.

DISCLOSURE OF INVENTION

It is the object of the present invention to make a pulley tensioner for satisfying the aforesaid need.

The aforesaid object is achieved by a pulley tensioner according to the invention.

BRIEF DESCRIPTION OF THE DRAWING

For a better understanding of the present invention, a preferred embodiment will now be described only by way of non-limitative example and with reference to the accompanying drawing, in which FIG. 1 is a section along an axial plane of a pulley tensioner according to the present invention.

BEST MODE FOR CARRYING OUT THE INVENTION

With reference to the FIGURE, numeral 1 indicates as a whole a pulley tensioner for a timing belt drive comprising a pivot 2 defining an axis A and a plate 3 perpendicular to axis A and mounted rigidly to pivot 2 so as to form a rigid base adapted to be removably connected to a wall of an internal combustion engine. Tensioner 1 further comprises an eccentric arm 4 mounted on pivot 2 and an annular pulley 5 concentrically mounted on eccentric arm 4 and rotatable about an axis B parallel to and distanced from axis A.

Specifically, pivot 2 integrally defines an end portion 6 rigidly connected to plate 3 and a cylindrical portion 7 defining axis A for guiding the rotation of eccentric arm 4.

Eccentric arm 4 is radially supported on cylindrical portion 7 by a bushing 8 and rests in axial direction on plate 3 by means of a friction ring 9 formed by polyamide 4.6 and having a reversed T section for coupling with a seat corresponding to the eccentric arm 4.

Friction ring 9 is integral with eccentric arm 4 and presents a plurality of preferably radial impressions cooperating with a sliding surface 11 of plate 3. In use, the oil present between friction ring 9 and plate 3 is evacuated by means of impressions and the value of the damping torque increases as a consequence.

In order to apply a high axial load adapted for a use in presence of oil, tensioner 1 comprises a washer spring 12 and a lid 13 rigidly connected to a head portion 14 of pivot 2 to load washer spring 12 in axial direction and consequently apply a force parallel to axis A on friction ring 9.

Preferably, eccentric arm 4 defines a circular recess 15 arranged on axially opposite side with respect to plate 3 to accommodate washer spring 12 and lid 13 with radial clearance.

Furthermore, preferably, a friction disc 16 formed by polyamide 4.6 is interposed between eccentric arm 4 and washer spring 12 to prevent damage to eccentric arm 4 due to the relative motion and to apply a friction torque.

Eccentric arm 4 presents a height essentially equal to that of pulley 5 and further defines an annular cavity 17 open towards plate 3 and accommodating a helical torsion spring 18 arranged concentrically to pivot 2. Specifically, torsion spring 18 presents a smaller diameter than that of friction ring or element 9 and comprises a first end portion fixed with respect to pivot 2 and a second end portion fixed with respect to eccentric arm 4.

Furthermore, the turns of torsion spring 18 present a square or rectangular cross section for applying a high torque on eccentric arm 4 and keeping the radial dimension small.

Annular cavity 17 accommodates an axial protrusion 21 preferably obtained by bending a portion of plate 3 arranged radially between torsion spring 18 and friction ring 9.

Specifically, annular cavity 17 is shaped so as to define two stops (not shown) to limit the maximum angular stroke of eccentric arm 4 with respect to plate 3 by means of axial protrusion 21.

In order to allow the relative rotation of pulley 5 with respect to eccentric arm 4 the tensioner further comprises a journal bearing as described below.

Specifically, eccentric arm 4 defines a peripheral cylindrical surface 22 surrounded by pulley 5, a shoulder 23 protruding in axial relief with respect to cylindrical surface 22 and having a continuous annular profile, and a seat configured for the assembly of an elastic ring 25. Elastic ring 25 is arranged on axially opposite part of shoulder 23 with respect to cylindrical surface 22 and axially locks a ring 26 arranged directly in contact with pulley 5 and defining the axial position of the latter. For example, ring 26 is formed by steel with a manganese phosphating surface treatment to reduce the friction coefficient.

Preferably, cylindrical surface 22 presents a roughness Ra from 0.3 to 0.9 microns and the corresponding cylindrical surface which defines central body 27 presents a roughness Ra from 0.2 to 0.8 microns. Such values allow to reduce the wear between eccentric arm 4 and pulley 5.

Pulley 5 presents a central body 27 mounted with a predetermined radial clearance at ambient temperature on cylindrical surface 22 and mounted with axial clearance between shoulder 23 and ring 26, and two wings symmetrically protruding from opposite sides of central body 27 and surrounding shoulder 23 and ring 26.

Specifically, the clearance at ambient temperature (24° C.) between eccentric arm 4 and pulley 5 is comprised between 6 and 8 microns to reduce the flow rate of the oil required by tensioner 1.

Furthermore, pivot 2 defines an oil feeding duct 29 having an inlet 30 defined on the supporting face of end portion 6 and a radially arranged outlet 31.

Eccentric arm 4 further defines a radial duct 32 having an inlet facing pivot 2 and an outlet communicating with a sump 33 recessed with respect to cylindrical surface 22.

Specifically, radial duct 32 is axially arranged between recess 15 and cavity 17 and is coaxial to output 31 of duct 29. The axis of radial duct 32 does not lay on the middle line of cylindrical surface 22 and of pulley 5 because of the axial dimension of helical spring 18, while sump 33 is symmetric with respect to the middle line of cylindrical surface 22 to allow a symmetric action on pulley 5.

Conveniently, moreover, bushing 8 presents a passage 34 having a circumferential dimension so as to allow the flow of oil in any relative angular position of eccentric arm 4 with respect to pivot 2 without causing any restriction or choking while the oil flows from outlet 31 towards radial duct 32.

Furthermore, the choice of materials used to make eccentric arm 4 and pulley 5 is such that the material of eccentric arm 4 presents a higher thermal expansion coefficient than that of the material used for pulley 5.

Preferably, eccentric arm 4 is formed by aluminium and pulley 5 by steel.

Furthermore, tensioner 1 comprises a seal to prevent the oil let into radial duct 32 from escaping along bushing 8 towards plate 3 before reaching sump 33.

Specifically, the seal is supported by a tubular portion 35 of eccentric arm 4 protruding within cavity 17 towards plate 3 and accommodating a portion of bushing 8 and of pivot 2.

Preferably, the seal comprises a gasket, e.g. an o-ring 36 accommodated in an annular seat 37 carried by tubular portion 35 and cooperating with cylindrical portion 7 of pivot 2.

Advantageously, tensioner 1 comprises a second seal 38 arranged on axially opposite side of o-ring 36 with respect to radial duct 32 for preventing the oil from escaping from lid 13.

Specifically, seal 38 comprises an o-ring interposed between lid 13 and friction disc 16 having an internal diameter larger than the external diameter of washer spring 12.

Preferably, friction disc 16 defines a plurality of concentric grooves 39 open towards a flat face of circular recess 15 to further slow down a leakage of oil towards lid 13 and define a labyrinth seal.

According to a preferred embodiment, seal 38 and labyrinth seal 39 are arranged in parallel with respect to a radial gap 40 defined between friction disc 16 and head portion 14 of pivot 2.

Furthermore, it has been found that the rigidity of pulley 5 against ovalisation caused by the load of the belt is a parameter to be taken into consideration for the correct operation of tensioner 1 in view of the fact that the clearance between pulley 5 and eccentric arm 4 is small. Specifically, it has been found that not very rigid pulleys tend to be deformed under the load of the belt so as to decrease the oil film and cause a possible direct contact between pulley 5 and cylindrical surface 22.

It has been verified that a pulley 5 having a relationship between radial thickness S of central body 27 and external diameter D that is greater than 7.5% and preferably of 10.7% allows to obtain a sufficiently rigid pulley 5 in radial direction to avoid the abovementioned problems of reliability.

The operation of tensioner 1 is as follows.

Tensioner 1 is mounted on the internal wall of the internal combustion engine compartment which presents a port connected to the oil pump delivery. Furthermore, the plane crossing axis A and radial duct 32 is arranged in a predetermined position with respect to the resultant of the action of the belt on pulley 5 in a resting condition of the drive.

Specifically, such plane precedes the resultant of the action of the belt on pulley 5 with respect to the rotation of pulley 5 during operation by an angle comprised between 60° and 130°.

For example, in relation to the FIGURE, if pulley 5 turns clockwise looking from portion 14 towards end portion 6, the resultant of the action applied by the belt enters the sheet and presents an angle of 90° with respect to the axis of radial duct 32.

In order to reliably define such position, end portion 6 of pivot 2 defines a seat 41 having an axis coplanar to axis A and the axis of duct 29.

The action of the belt on pulley 5 is asymmetric and tends to approach pulley 5 to cylindrical surface 22 so that the minimum radial distance between pulley 5 and cylindrical surface 22 is interposed between the resultant of the action of the belt on pulley 5 itself and the axis of radial duct 32.

In this manner, when pulley 5 turns with respect to eccentric arm 4, a hydrodynamic force is generated which maintains pulley 5 suspended with respect to cylindrical surface 22 there being interposed an oil cavity.

The oil is fed continuously by means of duct 29 and subsequently exits from the passages defined between central body 27, shoulder 23 and elastic ring 25 to reach the oil pump intake by means of the engine lubrication circuit.

As it is known, the hydrodynamic force is directly proportional to the viscosity of the fluid and is reversely proportional to the height of the oil cavity according to Reynolds's equation.

Furthermore, the viscosity of the oil tends to decrease with the increase of temperature but such effect is contrasted by the corresponding decrease of the height of the oil cavity due to the fact that eccentric arm 4 expands more than pulley 5 because it is formed by aluminium while pulley 5 is formed by steel.

In this manner, it is possible to compensate for the effect of the decrease of viscosity with a corresponding decrease of the height of the oil cavity. The result is that tensioner 1 essentially maintains the hydrodynamic force on pulley 5 constant with respect to a temperature variation.

Furthermore, tensioner 1 is fed by a circuit which, exceeded a predetermined engine rate, maintains its delivery pressure constant by means of a pressure limiting valve mounted in series to the delivery of a constant displacement pump.

Tensioner 1 is arranged in parallel with respect to other loads and receives a flow rate depending on the total load loss encountered by the oil while crossing tensioner 1.

By means of the choice of materials, the radial oil film tends to decrease so that the total hydraulic resistance increases and consequently compensates for the increase of flow due to the decrease of oil viscosity.

In the condition in which the oil circuit is at constant pressure, it therefore results that tensioner 1 maintains the required flow essentially constant with respect to a temperature variation.

The pressure limiting valve controls the oil circuit when the engine rate exceeds a predetermined value. When the engine runs under such predetermined rate, such as for example at slow speed, the oil flow rate is relatively low and it is important to reduce the leakages of oil to allow the access of a minimum flow rate towards sump 33.

For this purpose, o-ring 36 allows to avoid an oil leakage towards plate 3 through the clearance between cylindrical portion 7, bushing 8 and tubular portion 35.

The oil leakage towards head portion 14 is prevented by a second seal. According to a preferred embodiment such seal is defined by friction disc 16 which is loaded by washer spring 12 so that the load closes the axial clearances and prevents oil leakage. The efficacy of such seal is improved by means of a labyrinth seal 39.

Furthermore, o-ring 38 blocks oil leakages which possibly escape through radial gap 40 because the path communicating with radial gap 40 and defined between friction disc 16 and lid 13 is closed.

The advantages that the tensioner 1 according to the present invention allow to obtain are as follows.

The journal bearing between pulley 5 and eccentric arm 4 allows to eliminate the ball bearing which normally supports a pulley in a pulley tensioner. Furthermore, the turns of torsion spring 18 present a square or rectangular section to apply the same torque of a circulation section turn spring in a smaller radial space.

Seal 38 arranged on the same side as cupped spring washer 12 allows to avoid leakages due to the annular shape of friction disc without affecting the axial dimensions.

Furthermore, the seat for seal 38 may be defined simply and cost-effectively by friction disc 16 which is formed by moulding and does not require more costly cutting machining on metallic components such as pivot 2 or eccentric arm 4. The fact that washer spring 12 loads friction element 16 against eccentric arm 4 intrinsically defines a second seal which contrasts the oil leakages along the contact surface between friction element 16 and eccentric arm 4.

The reduced oil consumption thus obtained allows to guarantee the correct operation of tensioner 1 also when the engine speed is slow and the feeding flow is reduced. Furthermore, a reduced consumption of oil is preferable because it may allow, in some applications, to mount the tensioner aboard engines without requiring the increase of the oil pump displacement and power. Such result represents a considerable cost advantage when it is expected to upgrade an engine originally designed for a chain drive.

The geometry of pulley 5 must be such to avoid deformations which negatively affect the dimensions of the oil film when tensioner 1 is loaded by belt.

The materials of eccentric arm 4 and of pulley 5 are further selected so that the hydrodynamic force and the required flow rate are essentially constant when the oil circuit pressure is controlled by the pressure relief valve.

The assembly of pulley 5 on eccentric arm 4 by means of elastic ring 25 is particularly simple and not costly and allows to obtain the required precision to correctly define the axial clearance of pulley 5.

Furthermore, washer spring 12 allows to obtain high axial loads and contained dimensions and therefore allows to obtain a solution both to the problem of high friction torques also in the presence of lubricating oil and of containing the dimensions allowing to be mounted on engines previously designed for a chain timing drive.

The increase of friction torque is advantageously obtained also by means of the use of radial impressions 10 which prevent the formation of a lubricant oil film between ring 9 and plate 3.

Sump 33 allows to make the oil distribution along the height of cylindrical surface 22 symmetric so as to avoid unbalances of pulley 5.

It is finally clear that changes and variations can be implemented to tensioner 1 described and illustrated herein without departing from the scope of protection of the accompanying claims.

Specifically, friction ring 9 may be connected in fixed manner to plate 3 and cooperate in contact with a specific fixed surface with respect to eccentric arm 4.

Furthermore, a ring may be contemplated in axial abutment against shoulder 23 to guide central body 27. Preferably, such ring presents an anti-friction or anti-wear layer facing central body 27 to avoid damage due to the relative movement and the rubbing against pulley 5. Still more preferably, such ring is formed by steel and the layer is formed by surface manganese phosphating.

Friction ring 9 and friction disc 16 may further be formed by polyamide 6.6.

Pivot 2 and plate 3 may present corresponding hardened surface layers by means of a treatment performed by means of induction tempering or chrome-plating or nickel-plating to obtain a greater resistance to wear. Specifically, the surface layer is made to define sliding surface 11 and to define the cylindrical surface onto which bushing 8 is mounted.

Preferably, the surface treatment allows to obtain a surface hardness of 600 on the Vickers scale.

The invention claimed is:

1. A tensioner for a belt drive comprising: a base defining an axis (A), a mobile element hinged to move about said axis (A) and including a guiding surface, an elastic element for actuating said mobile element, a pulley mounted on said mobile element about said guiding surface and rotatable about a second axis (B) offset with respect to said axis (A), a locking element for axially fastening said mobile element to said base, an annular friction element interposed between said mobile element and said locking element, a spring interposed between said friction element and one of said either the mobile element or the locking element and providing an axially directed force on said annular friction element, and a journal bearing adapted to be fed by oil to support said pulley on said guiding surface and wherein said elastic element is helical and presents a square or rectangular cross section.

2. The tensioner according to claim 1, further including a fluid seal to seal the oil fed to said journal bearing arranged on the same side as said spring with respect to said friction element.

3. The tensioner according to claim 2, wherein said fluid seal comprises an O-ring.

4. The tensioner according to claim 2 further including a labyrinth seal defined between said friction element and the other of either the mobile element or the locking element that is not in direct contact with said spring.

5. The tensioner according to claim 1 wherein said pulley is formed from steel, and a ratio between a maximum thickness (S) and a maximum diameter (D) of said pulley is greater than 7.5%.

6. The tensioner according to claim 5, wherein said ratio between maximum thickness (S) and maximum diameter (D) of said pulley is greater than 10%.

7. The tensioner according to claim 1 wherein the mobile element is made of a material having a first thermal expansion coefficient and the pulley is made of a material having a second thermal expansion coefficient that is lower than said first thermal expansion coefficient.

8. The tensioner according to claim 1 wherein the journal bearing comprises a first duct perpendicular to said axis (A) and defining an outlet for feeding oil onto said guiding surface.

9. The tensioner according to claim 8, wherein the first duct is defined by said mobile element.

10. The tensioner according to claim 8 wherein the base comprises a pivot member that is coaxial to said axis (A) and includes a second duct adapted to be fed by a flow rate of pressurised fluid and being fluidically connected to said first duct.

11. The tensioner according to claim 10, wherein said mobile element is radially supported on said pivot by means of a bushing (8) defining a passage to allow the passage of oil between said first duct and said second duct (29).

12. The tensioner according to claim 8 further including a second fluid seal interposed between said mobile element and said base, said first duct being interposed between said first and second fluid seals.

13. The tensioner according to claim 8 wherein said guiding surface is axially delimited by a first and a second shoulder and defines an axially symmetric recess fluidly connected to said first duct to apply a symmetric action on said pulley.

14. The tensioner according to claim 13, further including a ring axially interposed between one of the said first and second shoulders and said pulley.

15. The tensioner according to claim 14, wherein at least one of said first and second shoulders is defined by an elastic ring.

16. The tensioner according to claim 8 wherein said first duct precedes the resultant of the action of said belt on said pulley by an angle comprised between 60° and 130°.

17. The tensioner according to claim 1 further including a second friction element cooperating in relative motion with a contact surface arranged transversally with respect to said axis (A), said spring maintaining contact with said friction element and said contact surface.

18. The tensioner according to claim 17, wherein said second friction element presents at least one impression facing said contact surface.

19. The tensioner according to claim 1 wherein said base comprises a component having a surface hardened by means of a surface treatment.

* * * * *